United States Patent
Geng (10) Patent No.: US 11,242,146 B2
(45) Date of Patent: Feb. 8, 2022

(54) RING-SHAPED AIRFOIL AIRCRAFT CAPABLE OF TAKING OFF AND LANDING VERTICALLY, AND HOVERING

(71) Applicant: Tiankan Geng, Lanzhou (CN)

(72) Inventor: Tiankan Geng, Lanzhou (CN)

( * ) Notice: Subject to any disclaimer, the term of this patent is extended or adjusted under 35 U.S.C. 154(b) by 604 days.

(21) Appl. No.: 16/191,448

(22) Filed: Nov. 15, 2018

(65) Prior Publication Data

US 2020/0070971 A1 Mar. 5, 2020

(30) Foreign Application Priority Data

Aug. 31, 2018 (CN) .......................... 201811010491.2

(51) Int. Cl.
*B64C 39/06* (2006.01)
(52) U.S. Cl.
CPC .................... *B64C 39/062* (2013.01)
(58) Field of Classification Search
CPC ..... B64C 39/001; B64C 39/062; B64C 27/20; B64C 2201/027
See application file for complete search history.

(56) References Cited

U.S. PATENT DOCUMENTS

| 3,199,809 A * | 8/1965 | Modesti | B64C 29/0066 244/12.2 |
| 5,653,404 A * | 8/1997 | Ploshkin | B63G 8/00 244/12.2 |

* cited by examiner

*Primary Examiner* — Timothy D Collins
*Assistant Examiner* — Terri L Filosi (57) ABSTRACT

A ring-shaped airfoil aircraft capable of taking off and landing vertically, and hovering, comprising: a fuselage, a cockpit; a passenger cabin, a power bay, a tapered tail rudder, a ring-shaped airfoil; a flight controller. The ring-shaped airfoil aircraft has the flying abilities for vertical takeoff and landing and hovering at a fixed altitude of multiaxial rotary wing powered aircraft, but compared with multiaxial rotary wing powered aircraft, its flight attitude is hardly in by air side flow, the flight attitude is more reliable. In addition, it can implement the airspeed of fixed wing ducted aircraft, and the flight energy consumption is much less than the existing fixed wing ducted aircraft, and its takeoff and landing are free of runways. The ring-shaped airfoil aircraft can obtain the lift for aircraft, reduce the drag to aircraft and enhance its flight safety performance.

5 Claims, 11 Drawing Sheets

RING-SHAPED AIRFOIL AIRCRAFT CAPABLE OF TAKING OFF AND LANDING VERTICALLY, AND HOVERING

BACKGROUND OF INVENTION

1. Field of the Invention

The invention relates to a field of aeronautical and aerospace technology, particularly to a ring-shaped winged aircraft capable of taking off and landing vertically, and hovering.

2. Description of Related Art

With progressive development of social economy, the urban population and motor vehicles increase day after day, the urban road traffic jam and congestion have been ubiquitous in cities all over the world, leading to traffic jams, accidents, energy waste and environmental pollution resulted from the multiplied automobile emission, which not only restrict, the sustainable development of cities and social economy severely, but also influence the quality of people's life severely. The ground transportation has been unable to meet people's overgrowing demands for material life, so a faster, more convenient and efficient aerial three-dimensional traffic will be a new topic concerned and studied by people.

At present, there are two classes of common aerial crafts:

(1) Fixed wing aircraft, e.g. civil aircraft: altitude 5000-10000 m, speed 500-800 km/h. The civil aircraft usually uses fixed wings and jet engines, high load carrying capacity, high airspeed and high agility. Its flight is free from the obstructions of high mountains, rivers, deserts and oceans. It is safe and comfortable, less affected by weather, high coefficient of safety. However, the major defect in the fixed wing aircraft is that it must be accelerated or decelerated by taxiing during takeoff and landing, so it cannot be as popular as cars as limited to the takeoff and landing sites.

(2) Rotary wing aircraft, e.g., helicopter: altitude below 10800 m, speed 0-300 km/h. The major characteristic of helicopter is that one or multiple large horizontally rotating power engines provide an upward lift. The helicopter is characterized by vertical takeoff and landing, staying in the air (hovering), low altitude, slow or backward flight. However, the helicopter is driven by free space screw power engine, the flight is restricted by air side flow and turbulence seriously, the driving is difficult, the safety is not guaranteed. It cannot be popularized as civil aircraft.

SUMMARY OF THE INVENTION

In view of this, for the deficiencies in the existing technology, the present invention provides a ring-shaped airfoil disc-shaped aircraft which can take off and land vertically and can hover, popularized as civil aircraft.

The present invention provides a ring-shaped airfoil aircraft capable of taking off and landing vertically, and hovering, comprising:

a fuselage, wherein the shape of the fuselage is dish-shaped disc;

cockpit, wherein the cockpit is round and protrudes from a top of the fuselage so that the pilot can look at surrounding environment;

a passenger cabin, which is located inside the fuselage and directly below the cockpit;

a power bay, wherein the power bay is disposed in a peripheral annular region of a passenger cabin, and the power bay is uniformly distributed with a plurality of upper and lower channels around a central axis of the aircraft;

an upper end of each channel is an annular interrupted suction port with a diversion, and an engine is arranged in each channel, the engine is inhaled inward through the upper end of the channel, and the lower end of the channel is jetted downward to provide flight power to the aircraft;

a tapered tail rudder, wherein the tapered tail rudder is disposed in a circular area within the passenger cabin and connected to a steering gear, and a tail end of the tail rudder can be elongated, shortened or disappeared according to the change in airspeed, so as to reduce the viscous force of air when the aircraft is ascending rapidly;

a ring-shaped airfoil, wherein the ring-shaped airfoil is disposed outside the power bay and changes the lift or reverse lift of air by protruding, upturning or concealing a flange, thereby taking off, landing or leveling during the flight;

a flight controller, which is located in the aircraft.

In comparison to the existing technology, the functions and effects of the present invention are:

(1) The aircraft of the present invention comprises an elliptic fuselage, a cockpit, a passenger cabin, a power bay, a tapered tail rudder, a ring-shaped airfoil and a flight controller. As the fuselage is an elliptic dish structure, which is the optimal contour structure for flying in the air flow field. The structure disturbs the gas flow field least, and has the minimum air resistance in the course of flight. The contour of the aircraft of the present invention has the flying abilities for vertical takeoff and landing and hovering at a fixed altitude of multiaxial rotary wing powered aircraft, but compared with multiaxial rotary wing powered aircraft, its flight attitude is hardly influenced by air side flow, the flight attitude is more reliable. The aircraft of the present invention can implement the airspeed of fixed wing ducted aircraft, and the flight energy consumption is much less than the existing fixed wing ducted aircraft, and its takeoff and landing are free of runways, that is a requisite particularity of a popular aircraft. The present invention obtains the lift for aircraft, reduces the drag to aircraft and enhances its flight safety performance.

(2) The present invention discloses the findings of the inventor about the flight of birds over the years, referring to the flight attitude of birds, the flight of birds is imitated and improved according to the aerodynamic characteristics, so as to design annularly discontinuous air suction inlets with diversion, a retractable tapered tail rudder and a ling-shaped airfoil. The air suction inlets allow the aircraft to admit air from normally above, so that a cylindrical vacuum negative pressure area is formed normally above the aircraft, an anabatic thrust is obtained. An engine is located in the middle of the channel of power bay, controllable and continuous rotating air admittance is generated by a series of refined calculation according to the power requirement, and the inducted air is jetted out of the gas vent in the bottom of aircraft, the corresponding thrust is obtained. A tapered tail rudder is located in the circular region of gas vents in the bottom of aircraft close to the passenger cabin, the tapered tail of tail rudder can be elongated, shortened or eliminated according to the change in airspeed, so as to reduce the viscous force of air when the aircraft is ascending rapidly. A ring-shaped airfoil which can be hidden or deformed is provided around the elliptic fuselage. The ring-shaped airfoil can be Hidden, upwarped or pulled down according to flight attitude, so as to obtain the optimal flying ability.

DETAILED DESCRIPTION OF THE INVENTION

Figure 1:
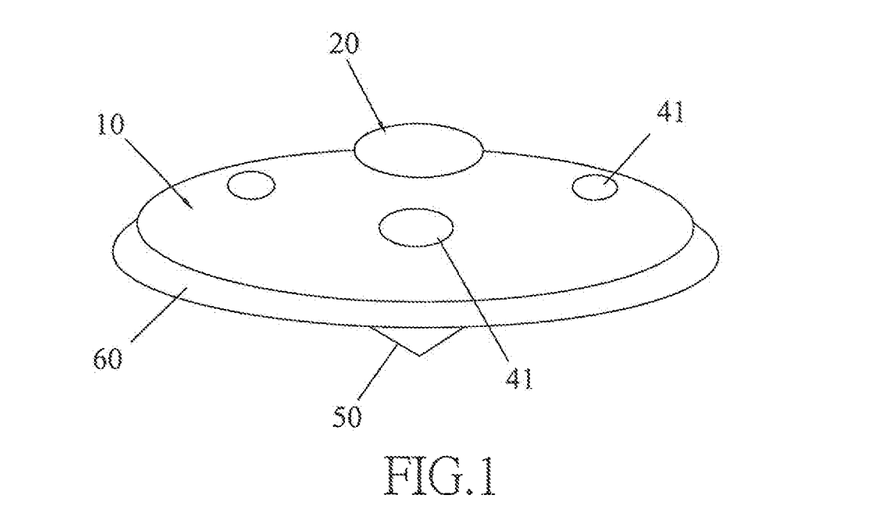
FIG. 1 is a schematic diagram of the contour of the aircraft of the present invention.

FIG. 1 to FIG. 5 show the preferred embodiment structure of the present invention, it is a ring-shaped airfoil 60 disc-shaped aircraft which can take off and land vertically and can hover, comprising a fuselage 10, a cockpit 20, a passenger cabin 30, a power bay 40, a tapered tail rudder 50, a ring-shaped airfoil 60 and a flight controller (not disclosed).

Wherein the contour of the fuselage 10 is dished disc shaped, the vertical section is an elliptic structure.

The cockpit 20 is circular, the cockpit 20 protrudes from the top of fuselage 10, so that the pilot can look round.

The passenger cabin 30 is located in the fuselage 10 and normally under cockpit 20, the passenger cabin 30 can be provided with a large room for passengers or cargoes.

Figure 2:
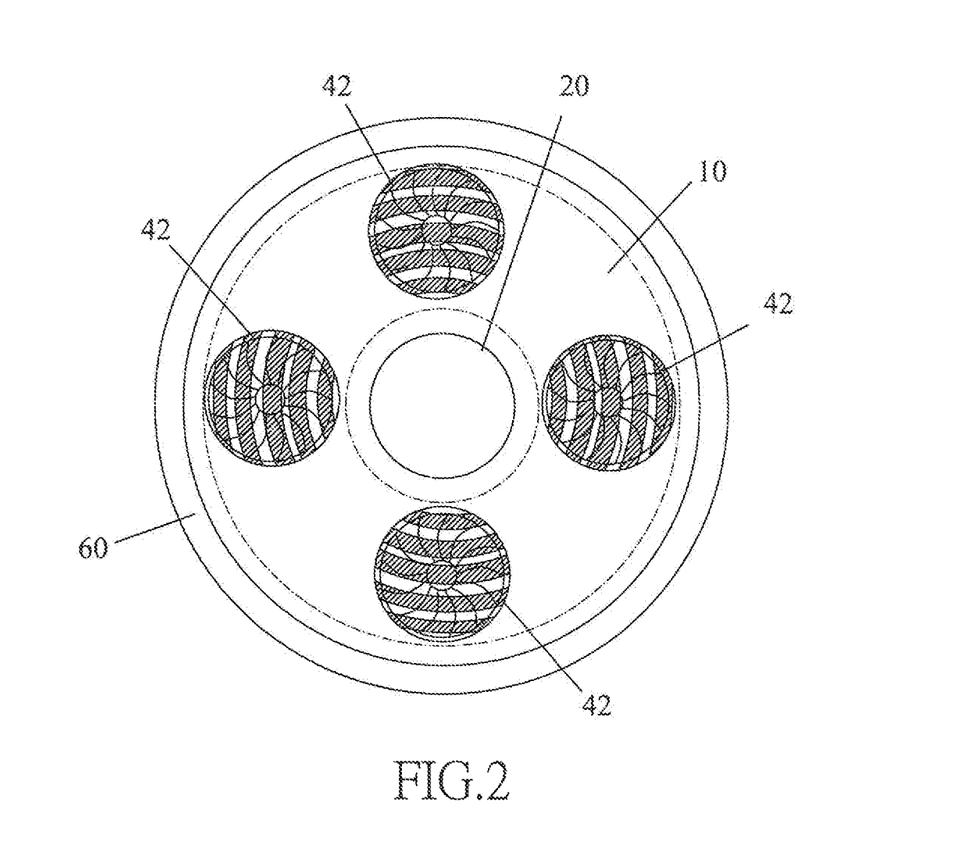
FIG. 2 is a top view of the aircraft of the present invention.

The power bay 40 is located in the annular region around passenger cabin 30, several vertically through channels 41 are distributed uniformly around the central axis of aircraft in power bay 40. The upper end of each channel 41 is an annularly discontinuous air suction inlet 42 with diversion. An engine 43 is located in each channel 41. The engine 43 admits air inward through the upper port and jets gas downward through the lower port, so as to provide flight power for the aircraft.

The tapered tail rudder 50 is located in the circular region within passenger cabin 30. The tapered tail rudder 50 is connected to the steering gear, the tapered tail of tail rudder can be elongated, shortened or vanished according to the change in airspeed, so as to reduce the viscous force of air when the aircraft is ascending rapidly.

The ring-shaped airfoil 60 is located in the area outside power bay 40. The flange of ring-shaped airfoil 60 protrudes downwards, upwarps or hides to change the lift or reverse lift of air, so as to implement ascending, landing or horizontal flight in the course of flight.

The flight controller is located in the aircraft for controlling the aircraft power battery management, real-time airspeed management, acceleration management for comfortable driving, cockpit 20 and passenger cabin 30 air pressure, temperature and oxygen level parameters management, and emergency escape management.

The numbers of channels 41 and engines 43 are set according to the load and dead weight of aircraft and the user requirements for the aircraft performance, there are three or more engines 43 in general. The present invention arranges four engines 43 to expound the structure property and principles of flight of aircraft.

There are four channels 41 in power bay 40 of the present invention, provided with four engines 43 to form a four-power aircraft. The aircraft can be provided with different types of aerojet engine 43, so as to obtain different performances and airspeeds, e.g. axial-flow turbojet 80, turbofan 90 and turboshaft 43 (not disclosed).

Figure 3:
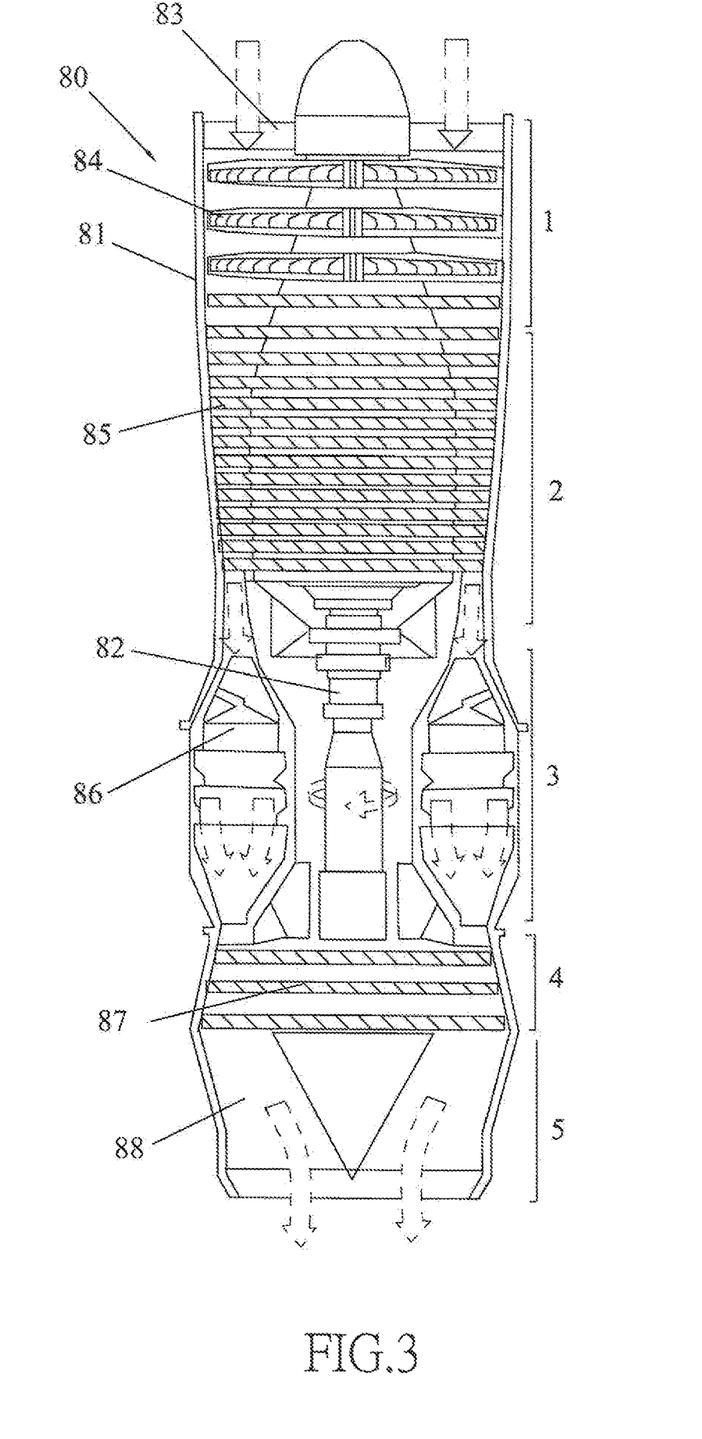
FIG. 3 shows an internal structure of axial-flow turbojet of the present invention.

As shown in FIG. 3, the axial-flow turbojet 80 comprises a first outer cylinder 81, a first shaft 82, an admission chamber 83, a low pressure compressor 84, a high pressure compressor 85, a first blast chamber 86, a first turbine 87 and an exhaust chamber 88. The first outer cylinder 81 is divided into five sections from top to bottom. The inside diameter of a first section is of one size. The inside diameter of a second section decreases gradually. The inside diameter of a third section increases for a length and then decreases. The inside diameter of a fourth section increases gradually. The inside diameter of a fifth section decreases gradually. The admission chamber 83 is located at the top of the first outer cylinder 81. The low pressure compressor 84 is located in the first section. The high pressure compressor 85 is located in the second section. The first blast chamber 86 surrounds the first shaft 82 and is located in the third section. The first turbine 87 is located in the fourth section. The exhaust chamber 88 is located in the fifth section.

This axial-flow turbojet 80 produces thrust fully depending on gaseous jet, there is only one turbojet flow channel 41, the efficiency is higher when the speed is high, providing high speed power. The axial-flow turbojet 80 is characterized by small cross section and high compression ratio. When the airspeed of aircraft exceeds sonic speed (Ma>1.0), the propulsive efficiency of this axial-flow turbojet 80 increases rapidly, even if in the range of Mach number 2.5-3.0, the propulsive efficiency of turbojet 43 is still 90%, (Ma 1.4) supersonic, cruise can be implemented.

Figure 4:
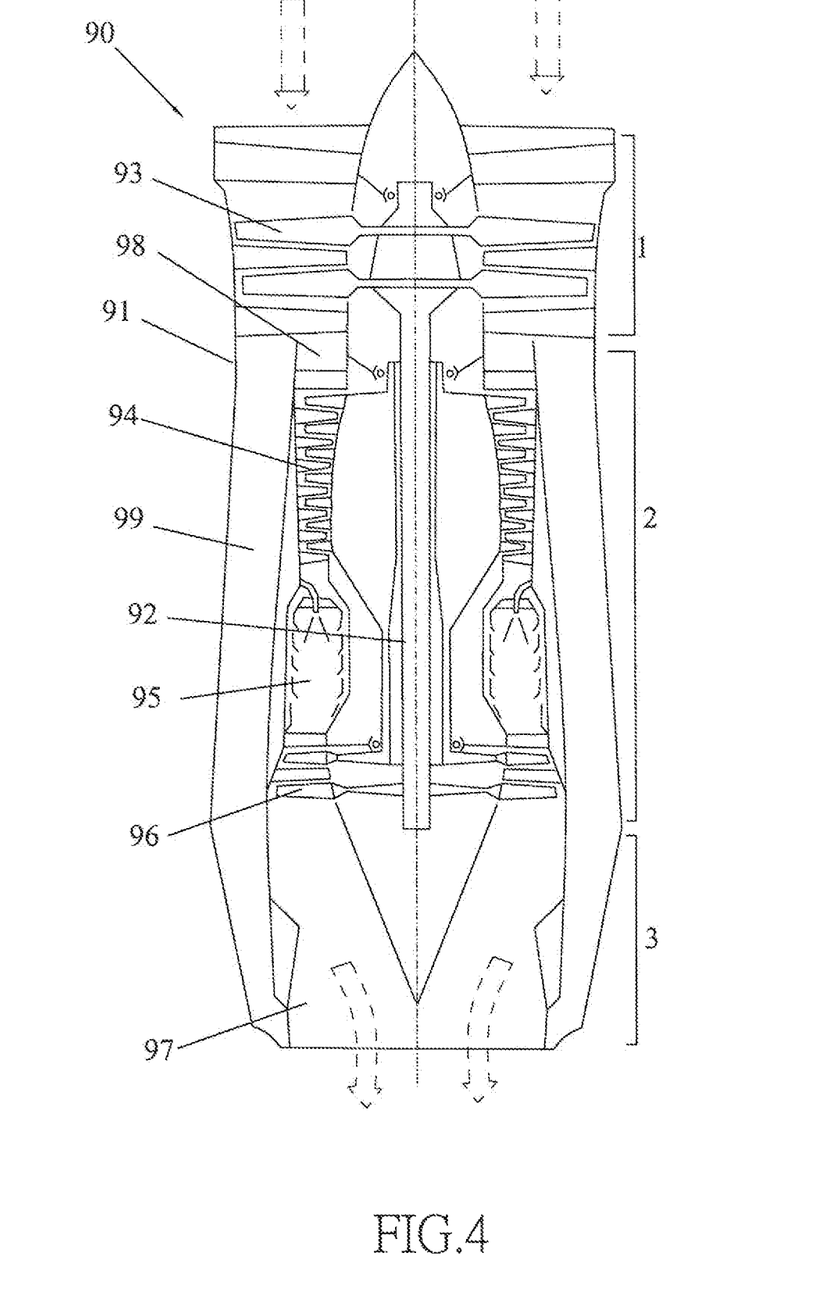
FIG. 4 shows an internal structure of turbofan of the present invention.

As shown in FIG. 4, the turbofan 90 comprises a second outer cylinder 91, a second shaft 92, a fan 93, a compressor 94, a second blast chamber 95, a second turbine 96 and a nozzle 97. The second outer cylinder 91 has an inner duct 98 and an outer duct 99. The inner duct 98 allows the hard core air of engine 43 to flow through. The outer duct 99 is located outside the inner duct 98, only the air from fan 93 flows through it. The second outer cylinder 91 is divided into three sections from top to bottom. The inside diameter of a sixth section decreases gradually, flaring. The outer duct 99 extends from the sixth section to an end of a seventh section. The inside diameter of the sixth section increases gradually. The inside diameter of a eighth section decreases gradually. The fan 93 is located in the sixth section. The compressor 94 is located in inner duct 98 and in the upper part of Section 2. The second blast chamber 95 is located outside the second shaft 92 and in the middle part of the seventh section. The second turbine 96 is located in the lower part of the seventh section. The eighth section is formed with the nozzle 97 disposed therein.

The area of the sixth section of the compressor 94 of the turbofan 90 is relatively large, and it is used as airscrew, pushing partial inducted air backward through the periphery of jet engine. The hard core air of engine 43 flows through inner duct 98, only the air from fan 93 flows through the outer duct 99 outside core engine.

Partial gas fired heat energy of the fanjet 43 is transferred to the fan 93 through the high efficiency second turbine 96, the high working efficiency of the fan 93 contributes to the thrust power of the engine 43; meanwhile the inner duct jet speed is reduced, the leaving loss of the engine 43 is reduced, contributing to the propulsive efficiency of engine 43. Therefore, the fanjet 43 has high overall efficiency, low fuel oil consumption rate and good engine 43 economy. The turbofan 90 is most applicable to airspeed of 400 to 1000 km/h.

In addition, this kind of turbofan 90 is high bypass turbofan of hybrid exhaust, as the jet speed of inner and outer bypasses of the engine 43 is reduced greatly, and the jet noise intensity of engine 43 is proportional to the eighth power of jet speed, the jet noise of the engine 43 is lower, and the total noise level of the engine 43 is lower, the noise pollution to the environment is reduced effectively, the aircraft is more comfortable.

The aircraft of the present invention can be equipped with other existing aircraft power devices of different specifications and models, so as to display completely different flying abilities. Different models and specifications of civil personal aerial crafts can be customized according to different user requirements for aircraft performance at an altitude of 0 to 10000 min the speed per hour space of 0 to 800 km/h.

Figure 5:
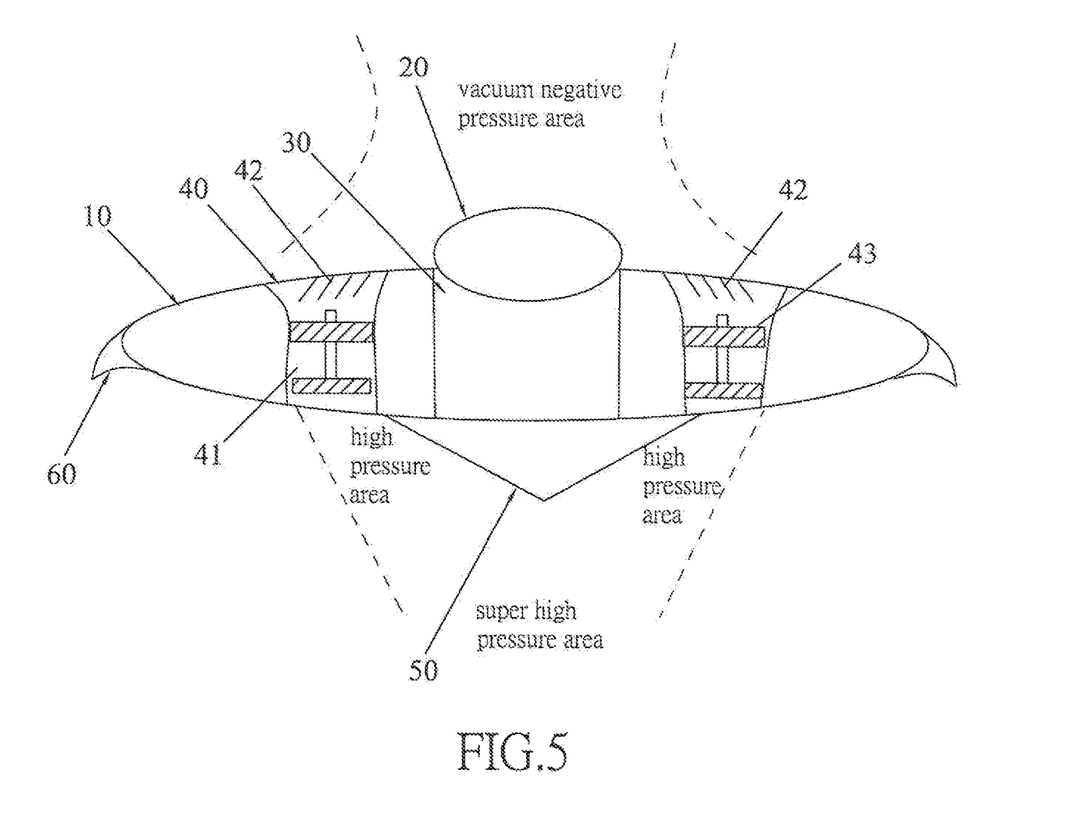
FIG. 5 is a bionic functional diagram of birds for the aircraft of the present invention.
Figure 6:
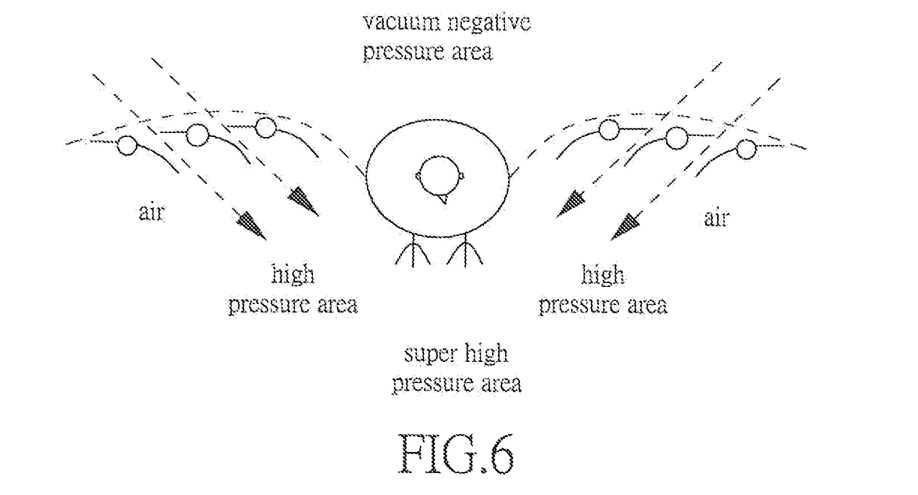
FIG. 6 shows airflow and mechanics of the flight of birds studied for the present invention.
Figure 7:
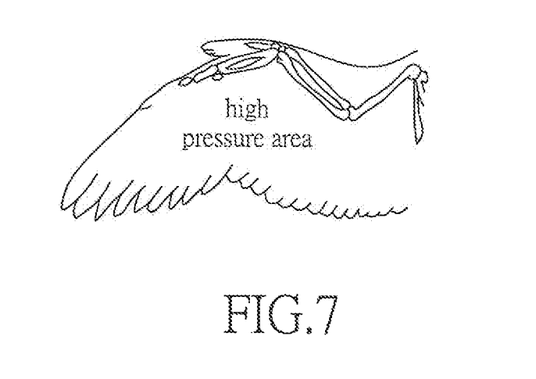
FIG. 7 shows a wing structure of birds studied for the present invention.

According to FIG. 2, FIG. 5 to FIG. 7, the flapping flight bionics of birds is studied, including how the structure of bird feather reduces the air friction during flight, how to perceive the velocity and direction of airflow, air pressure and altitude, and the wing up and wing down of birds. With the inspiration of flight mechanism of birds, the aircraft structure design proposal of the present invention is obtained. The annularly discontinuous air suction inlet 42 with diversion admits air normally above the aircraft, a cylindrical vacuum negative pressure area is formed normally above the aircraft, so as to obtain anabatic thrust (as shown in FIG. 5).

The engine 43 is located in the middle of the channel 41 of the power bay 40, controllable and continuous rotating air admittance is resulted from a series of refined calculation according to the power requirement, and the inducted air is jetted out of the gas vent in the lower part of aircraft (one side near geocenter) to obtain the corresponding thrust. The gas vent in the lower part of aircraft is provided with a tapered tail rudder 50 near the circular region within the passenger cabin 30. The tapered tail of tail rudder can be elongated, shortened or vanished according to the change in airspeed, so as to reduce the viscous force of air when the aircraft is ascending rapidly. A ring-shaped airfoil 60 which can be hidden or deformed is provided around the elliptic fuselage 10, the ring-shaped airfoil 60 can, be hidden, upwarped or pulled down according to the requirement for flight attitude, so as to obtain the best flying ability.

The flight controller of the ring-shaped airfoil 60 disc-shaped aircraft of the present invention is a hardware-based high-tech product integrated with singlechip technology, sensor technology, GPS navigation technology, communication technology, flight control technology, task control technology and programming technique. It controls the disc-shaped aircraft to implement climbing, hovering and cornering actions.

To be specific, the flight controller is integrated with and connected to computing element, navigation sensor, wireless data, transmission module, engine 43 and steering gear control modules. The navigation sensor comprises inertial navigation, geomagnetism, GPS, ultrasonic, laser, barometer, luminous flux and navigation camera. The engine 43 and steering gear control modules are connected to engine 43 and steering gear respectively. The wireless data transmission module implements remote controlled flight of aircraft. The flight controller runs an embedded system, and has sensor data fusion, attitude and position control, autonomous navigation, autopilot, waypoint management and fault protection function. For example, Canada Micropilot commercial flight control.

There are four channels in the power bay, provided with four engines to form a four-power aircraft. The four-power aircraft is equipped with forward-backward, right-left and up-down gyroscopes and three acceleration sensors with coordinate axes as axes of rotation to compose the inertial navigation module.

As shown in FIG. 8 to FIG. 13, there are four channels 41 in power bay 40 of the present invention, provided with four engines 43 to form a four-power aircraft. The four-power aircraft is equipped with forward-backward, right-left and up-down gyroscopes and three acceleration sensors with coordinate axes as axes of rotation to compose the inertial navigation module. The flight controller calculates the attitude, acceleration, angular rate of aircraft in relation to the ground by algorithm, and calculates the torsional force and lift for maintaining the motion state, which are fed back to engine 43 through the electronic regulator, so that the engine 43 exports appropriate force to complete the corresponding motion and attitude of aircraft.

(1) Vertical Motion

Figure 8:
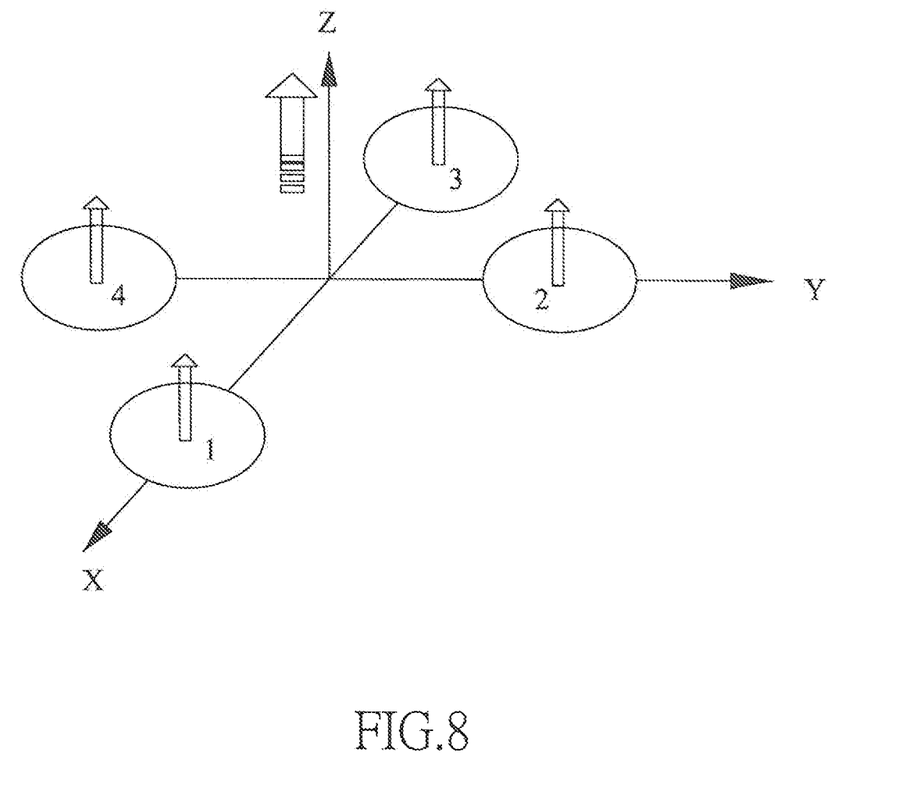
FIG. 8 is a vertical motion attitude characteristic diagram of aircraft of the present invention.

As shown in FIG. 8, there can be two pairs of adjacent engines 43 which run in opposite directions, so that the jetted airflow can balance the reactive torque to fuselage 10. When the output power of four engines 43 is increased simultaneously, the total thrust increases with the output power of engines 43, when the total thrust is enough to overcome the weight of complete machine, the four-power aircraft lifts off vertically. On the contrary, when the output power of four engines 43 is reduced simultaneously, the four-power aircraft descends vertically till it lands evenly, the vertical motion along z-axis is implemented. When the external disturbance quantity is zero, and the lift generated by engines 43 equals the deadweight of aircraft, the aircraft remains in hover position.

(2) Pitching Motion

Figure 9:
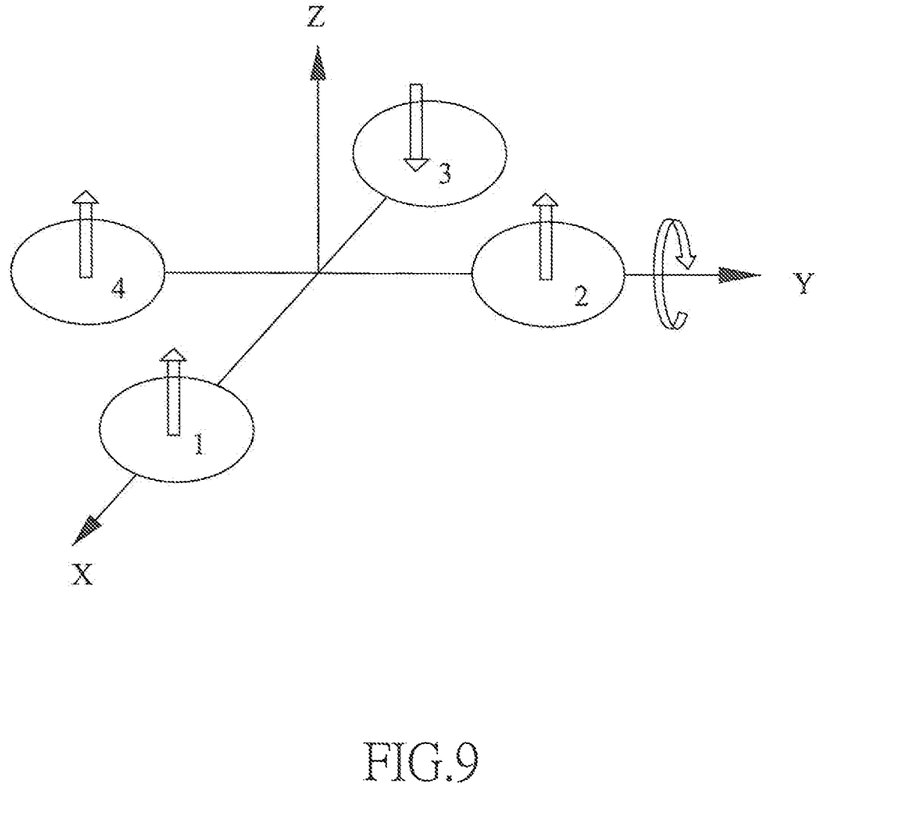
FIG. 9 is a pitching motion attitude characteristic diagram of aircraft of the present invention.

As shown in FIG. 9, the output power of Engine 1 increases, the output power of Engine 3, the output power of Engine 2 and Engine 4 remains stationary, in order to avoid the changes in the output power of engines 43 inducing the changes in overall torque and total thrust of four-power aircraft, the variations in the output power of Engine 1 and Engine 3 shall be identical. As the lift of Engine 1 increases and the lift of Engine 3 decreases, the generated unbalanced moment makes the fuselage 10 rotate round y-axis (direction shown in FIG. 9). In a similar way, when the output power of Engine 1 decreases and the output power of Engine 3 increases, fuselage 10 rotates in the other direction round y-axis, the pitching motion of aircraft is implemented.

(3) Rolling Motion

Figure 10:
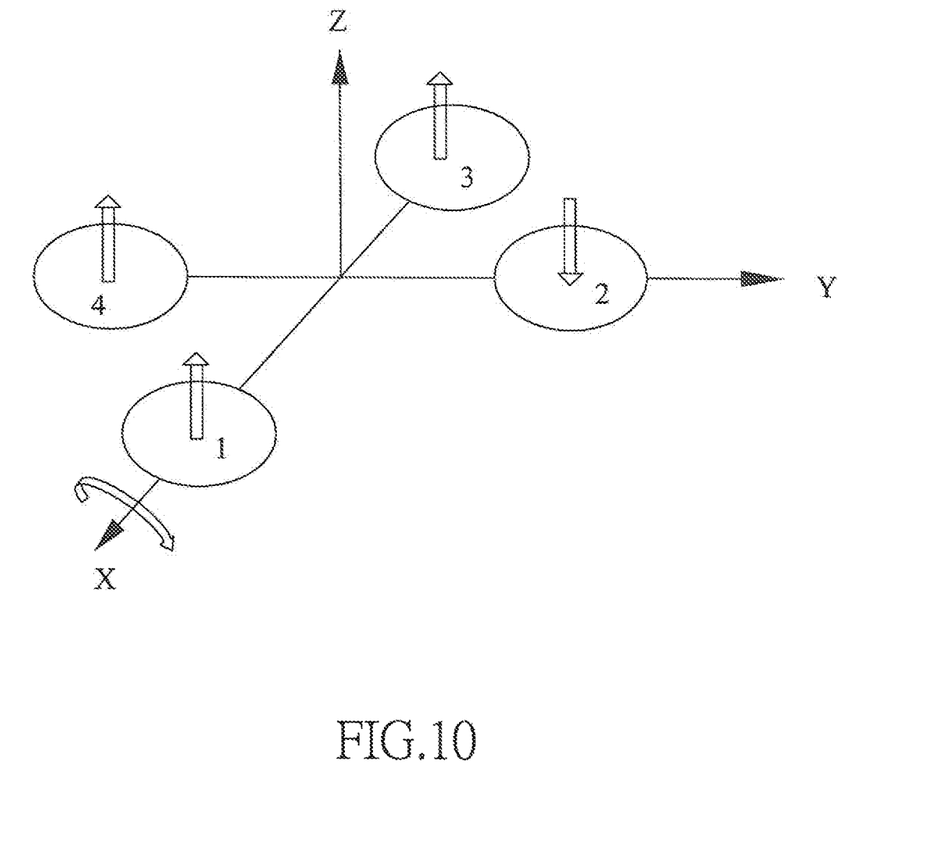
FIG. 10 is a rolling motion attitude characteristic diagram of aircraft of the present invention.

As shown in FIG. 10, the principle of rolling motion is the same as that of pitching motion. For rolling motion, the output power of Engine 2 and Engine 4 shall be changed, the output power of Engine 1 and Engine 3 remains constant, so that the fuselage 10 rotates round x-axis (forward and backward), the rolling motion of aircraft is implemented.

(4) Yawing Motion

Figure 11:
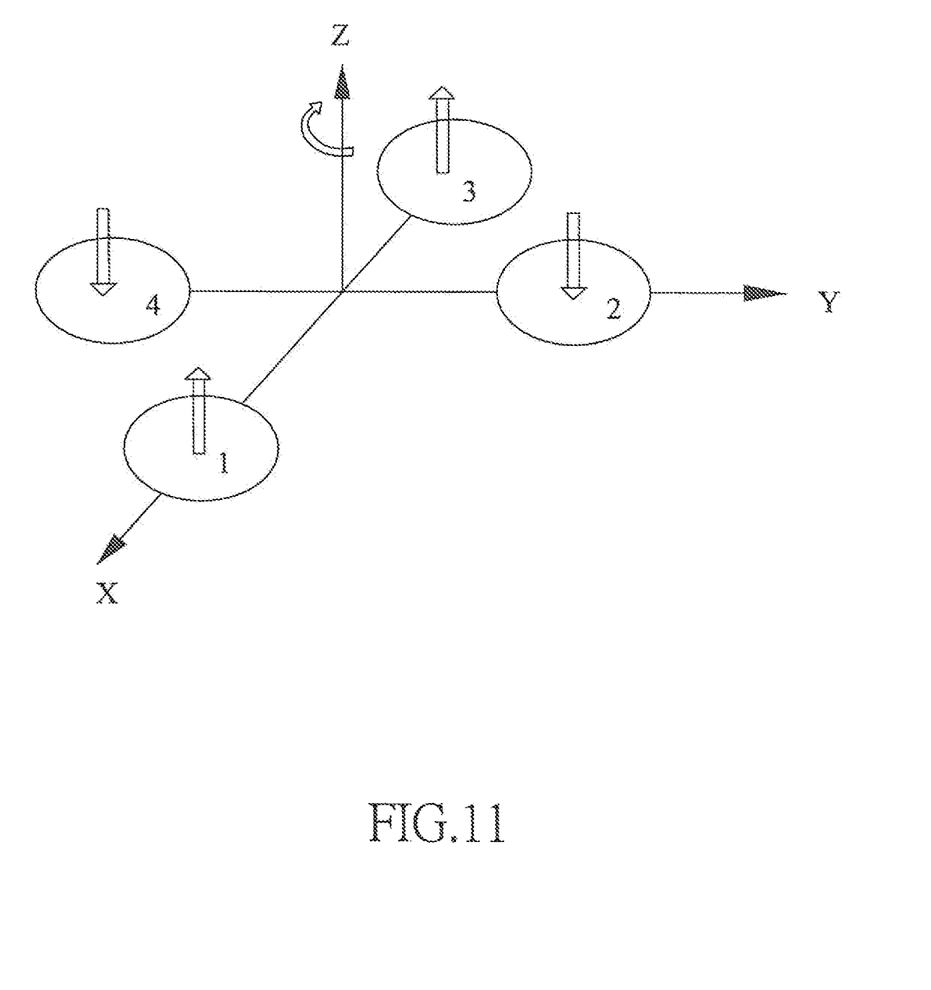
FIG. 11 is a yawing motion attitude characteristic diagram of aircraft of the present invention.

As shown in FIG. 11, the yawing motion of four-power aircraft can be implemented by reactive torque generated by engines 43 and appropriate tilt of fuselage 10. In the running process of engines 43, the air drag results in reactive torque opposite to the rotation direction. In order to overcome the reactive torque, two of the four engines 43 run forward, and two run backward, and the engines 43 on diagonal lines run in the same direction. The reactive torque is related to the output power of engines 43. When the four engines 43 have the same output power, the reactive torques generated by the four engines 43 are balanced, the four-power aircraft does not rotate. When the output powers of four engines 43 are not completely identical, the unbalanced reactive torque makes the four-power aircraft rotate. When the output power of Engine 1 and Engine 3 increases and the output power of Engine 2 and Engine 4 decreases, the reactive torque of Engine 1 and Engine 3 to fuselage 10 is larger than the reactive torque of Engine 2 and Engine 4 to fuselage 10, the fuselage 10 rotates round z-axis under the effect of excess reactive torque, the yawing motion of aircraft is implemented, the running direction is opposite to the running direction of Engine 1 and Engine 3. As the gross lift of engines 43 is unchanged, the aircraft will not perform vertical motion.

(5) Forward-Backward Motion

Figure 12:
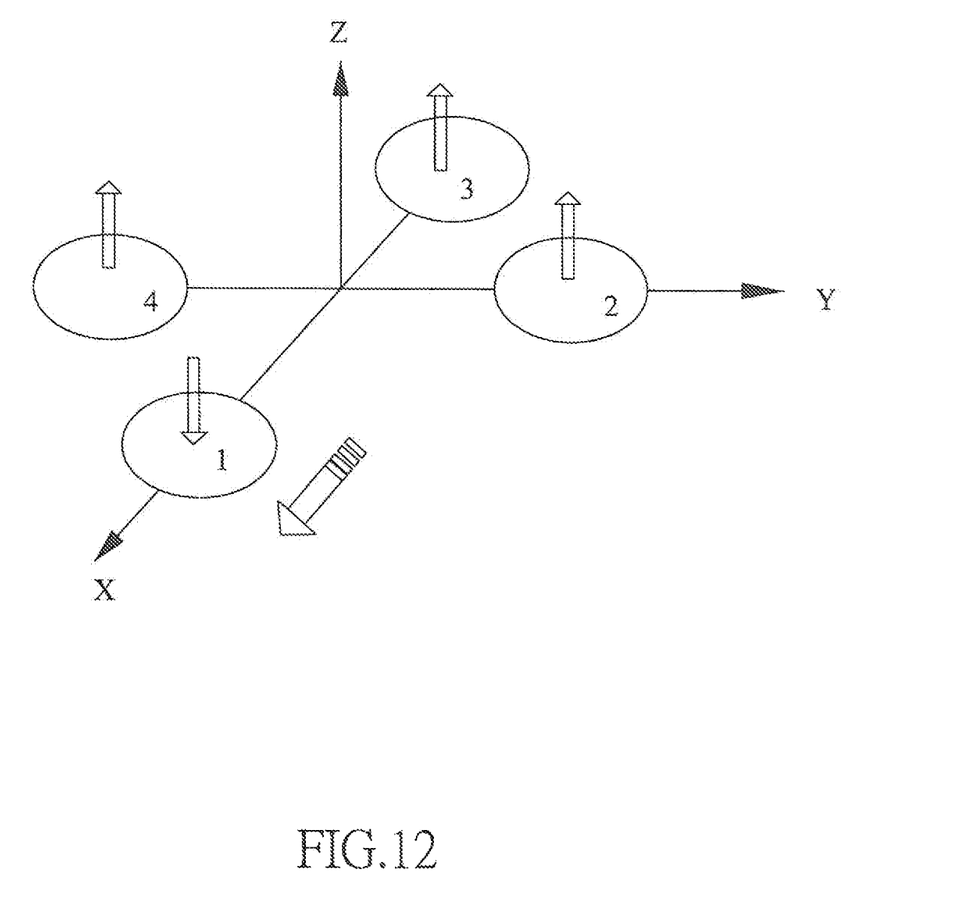
FIG. 12 is a forward-backward motion attitude characteristic diagram of aircraft of the present invention.

As shown in FIG. 12, in order to implement the forward-backward and left-right motions of aircraft on horizontal plane, a certain force must be applied to the aircraft on the horizontal plane, the output power of Engine 3 is increased, so that the thrust is increased, the output power of Engine 1 is reduced relatively, the thrust is reduced, meanwhile the output power of the other two engines 43 remains constant, the reactive torque is still in equilibrium. According to the pitching motion theory, the aircraft tilts to some extent first, leading to horizontal component of thrust of power engines 43, so as to implement forward motion of aircraft. The backward flight is just opposite to forward flight. As shown in FIG. 9 and FIG. 10, the aircraft performs horizontal motions along x and y axes while performing pitching and rolling motions.

(6) Lateral Motion

Figure 13:
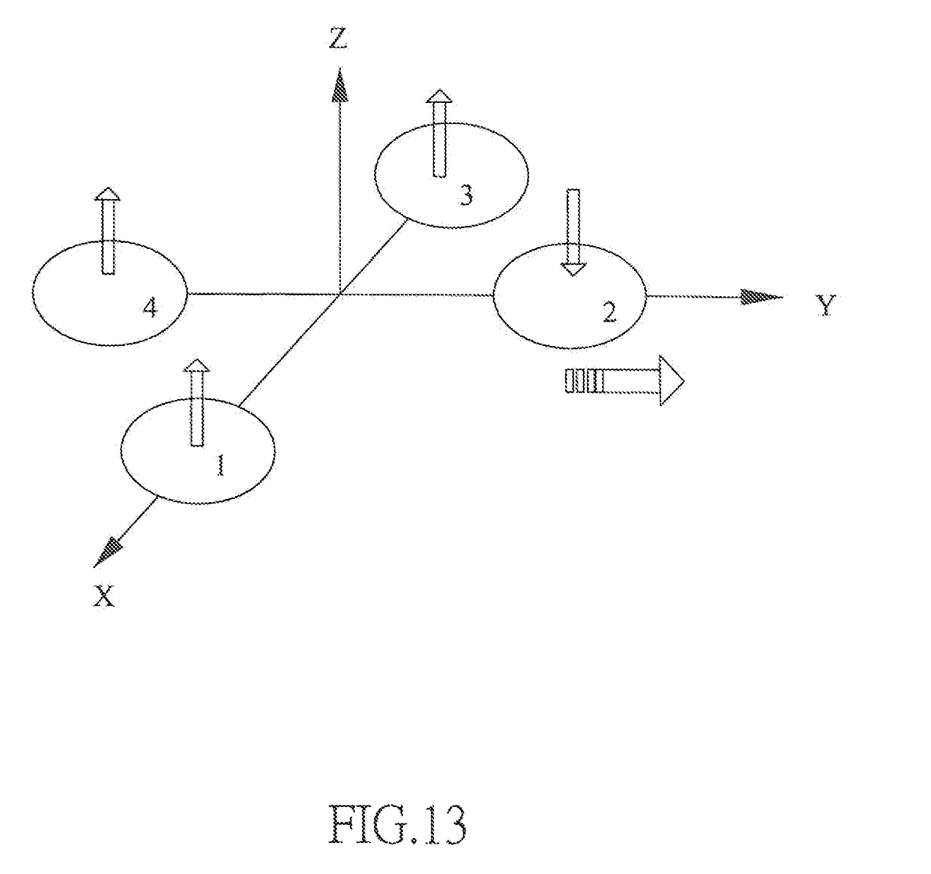
FIG. 13 is a lateral motion attitude characteristic diagram of aircraft of the present invention.

As shown in FIG. 13, as the four-power aircraft structure is symmetrical, the operating principle of crabbing is identical with forward-backward motion.

The above only describes some exemplary embodiments of the present invention. Those having ordinary skills in the art may also make many modifications and improvements without departing from the conception of the invention, which shall all fall within the protection scope of the invention.

I claim:

1. A ring-shaped airfoil aircraft capable of taking off and landing vertically, and hovering, comprising:
    a fuselage, wherein the shape of the fuselage is dish-shaped disc;
    a cockpit, wherein the cockpit is round and protrudes from a top of the fuselage so that the pilot can look at surrounding environment;
    a passenger cabin, which is located inside the fuselage and directly below the cockpit;
    a power bay, wherein the power bay is disposed in a peripheral annular region of the passenger cabin, and the power bay is uniformly distributed with a plurality of upper and lower channels around a central axis of the aircraft; an upper end of each channel is an annular interrupted suction port, and an engine is arranged in each channel, the engine is inhaled inward through the upper end of the channel, and the lower end of the channel is jetted downward to provide flight power to the aircraft;
    a tapered tail rudder, wherein the tapered tail rudder is disposed under the passenger cabin and connected to a steering gear
    a ring-shaped airfoil is disposed outside the power bay and changes the lift or reverse lift of air by protruding, upturning or, concealing a flange, thereby taking off, landing or, leveling during the flight;
    a flight controller, which is located in the aircraft.

2. The ring-shaped airfoil aircraft according to claim 1, wherein the engine is an axial-flow turbojet engine including a first outer cylinder, a first shaft, an inlet chamber, a low pressure compressor, a high pressure compressor, a first combustion chamber, a first turbine, and an exhaust chamber;
    the first outer cylinder is divided into five sections from top to bottom; an inside diameter of a first section is of one size; an inside diameter of a second section is gradually decreased; an inside diameter of a third section is firstly increased and then decreased after a certain distance; an inside diameter of a fourth section is gradually increased; and an inside diameter of a fifth segment is gradually decreased;
    the inlet chamber is disposed at a top of the first outer cylinder, the low pressure compressor is located inside the first section, the high pressure compressor is located inside the second section, the first combustion chamber surrounds the first shaft and is located inside the third section, the first turbine is located inside the fourth section, and the exhaust chamber is located inside the fifth section.

3. The ring-shaped airfoil aircraft according to claim 1, wherein the engine is a turbofan engine, including a second outer cylinder, a second shaft, a fan, a compressor, a second combustion chamber, a second turbine, and a nozzle; the second outer cylinder has an inner duct and an outer duct; the inner duct is configured for the hardcore air of the engine to pass therethrough, and the outer duct is located outside the inner duct and is configured only for the fan air passing through;
    the second outer cylinder is divided into three sections from top to bottom, and an inside diameter of a sixth section gradually decreases and has a bell mouth shape; the outer duct extends from a seventh section to an end of an eighth section; an inside diameter of the seventh section is gradually increased and an inside diameter of the eighth section is gradually decreased;
    the fan is disposed in the sixth section; the compressor is disposed in the inner duct and is located at an upper portion of the seventh section, the second combustion chamber is located outside the second shaft and is located at a middle portion of the seventh section, the second turbine is located in a lower portion of the seventh section; the eighth section is formed with the nozzle disposed therein.

4. The ring-shaped airfoil aircraft according to claim 1, where the flight controller is integrated with a computing unit, a navigation sensor, a wireless data transmission module, an engine and a steering gear control module, and the engine and the steering gear control module are respectively connected to the engine and the steering gear.

5. The ring-shaped airfoil aircraft according to claim 4, wherein the navigation sensor includes inertial navigation, geomagnetism, GPS, ultrasonic, laser, barometer, luminous flux and navigation camera.

\* \* \* \* \*